US008510321B2

(12) United States Patent
Ranganathan et al.

(10) Patent No.: US 8,510,321 B2
(45) Date of Patent: Aug. 13, 2013

(54) INFORMATION RETRIEVAL FROM RELATIONAL DATABASES USING SEMANTIC QUERIES

(75) Inventors: Anand Ranganathan, White Plains, NY (US); Zhen Liu, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/499,218

(22) Filed: Aug. 3, 2006

(65) Prior Publication Data

US 2008/0040308 A1 Feb. 14, 2008

(51) Int. Cl.
*G06F 7/00* (2006.01)
*G06F 17/30* (2006.01)

(52) U.S. Cl.
USPC .......................................... 707/765; 707/794

(58) Field of Classification Search
USPC ................. 707/1, 2, 3, 5, 773, 774, 775, 759, 707/794, 765
See application file for complete search history.

(56) References Cited

U.S. PATENT DOCUMENTS

| | | | |
|---|---|---|---|
| 6,108,619 A | 8/2000 | Carter | |
| 6,519,601 B1* | 2/2003 | Bosch | 707/100 |
| 6,795,825 B2* | 9/2004 | Rishe | 707/10 |
| 2003/0050927 A1* | 3/2003 | Hussam | 707/5 |
| 2003/0126136 A1* | 7/2003 | Omoigui | 707/10 |
| 2003/0225760 A1* | 12/2003 | Ruuth et al. | 707/5 |
| 2004/0139095 A1* | 7/2004 | Trastour et al. | 707/100 |
| 2005/0076015 A1* | 4/2005 | Dettinger et al. | 707/3 |
| 2006/0036592 A1* | 2/2006 | Das et al. | 707/4 |
| 2006/0036633 A1* | 2/2006 | Chong et al. | 707/101 |
| 2006/0053174 A1* | 3/2006 | Gardner et al. | 707/203 |
| 2006/0106793 A1* | 5/2006 | Liang | 707/5 |
| 2006/0161544 A1* | 7/2006 | Lee et al. | 707/6 |
| 2006/0235823 A1* | 10/2006 | Chong et al. | 707/1 |
| 2006/0242101 A1* | 10/2006 | Akkiraju et al. | 707/1 |
| 2007/0038609 A1* | 2/2007 | Wu | 707/3 |
| 2008/0010251 A1* | 1/2008 | Fontoura et al. | 707/3 |

OTHER PUBLICATIONS

Harris et al., "SPARQL Query Processing with Conventional Relational Database Systems", Oct. 2005, Springer Berlin/Heidelberg, Web Information Systems Engineeriing—WISE 2005 Workshops, pp. 235-244.*
NECIB et al. "Semantic Query Transformation using Ontologies", Jul. 2005, Proceedings of the 9th International Database Engineering & Application Symposium, 13 pages.*

(Continued)

*Primary Examiner* — James E Richardson
(74) *Attorney, Agent, or Firm* — Ference & Associates LLC

(57) ABSTRACT

In the realm of managing relational databases, a system that uses both the data in a relational database and domain knowledge in ontologies to return semantically relevant results to a user's query. Broadly contemplated herein, in essence, is a system that bridges a semantic gap between queries users want to express and queries that can be answered by the database using domain knowledge contained in ontologies. In accordance with a preferred embodiment of the present invention, such a system extends relational databases with the ability to answer semantic queries that are represented in SPARQL, an emerging Semantic Web query language. Particularly, users may express their queries in SPARQL, based on a semantic model of the data, and they get back semantically relevant results. Also broadly contemplated herein is the definition of different categories of results that are semantically relevant to a user's query and an effective retrieval of such results.

31 Claims, 7 Drawing Sheets

(56) References Cited

OTHER PUBLICATIONS

Saharia et al. "Enhancing Data Warehouse Performance through Query Caching", 2000, The Data Base for Advances in Inforamtion Systems, vol. 31, No. 3, pp. 43-63.*

Curé et al. "A Database Trigger Strategy to Maintain Knowledge Bases Developed Via Data Migration" Progress in Artificial Intelligence [online]. Springer Berlin/Heidelberg, Nov. 29, 2005 [retrieved on Nov. 19, 2009]. Retrieved from Internet< URL: http://www.springerlink.com/content/p326362915k237x4/fulltext.pdf> pp. 206-217.*

Curé, Olivier "Semi-automatic Data Migration in a Self-medication Knowledge-Based System" Professional Knowledge Management [online]. Springer Berlin/Heidelberg, Dec. 15, 2005 [retrieved on Nov. 19, 2009]. Retrieved from Internet<URL: http://www.springerlink.com/content/p8g742318u3k5862/fulltext.pdf> pp. 373-383.*

Berners-Lee, T., Hendler, J. and Lassila. O. *The Semantic Web*. Scientific American, May 2001.

Gangemi, A., Guarino, N., Masolo, C., Oltramari, A., Schneider, L. *Sweetening Ontologies with DOLCE*. In A. Gomez-Perez, V.R. Benjamin (eds.) Knowledge Engineering and Knowledge Management. Ontologies and the Semantic Web, 13th International Conference, EKAW 2002, Siguenza, Spain, Oct. 1-4, 2002, Springer Verlag, pp. 166-181.

J. Rogers, A. Rector and P. Pole, *The GALEN High Level ontology*, Proceedings of Medical Informatics Europe (MIE 96), Copenhagen: IOS Press, pp. 174-174, 1996.

Maryland Information and Network Dynamics Lab Semantic Web Agents Project, National Cancer Institute Thesaurus http://www.mindswap.org/2003/CancerOntology/.

M.K. Smith, C. Welty, and D. McGuinness. *OWL Web Ontology Language Guide*. http://www.w3.org/TR/owl-guide/, W3C Recommendation, (Feb. 10, 2004).

Prudhommeaux, E., and Seaborne, A. *SPARQL query language for RDF*. Working draft, W3C (2005), http:www.w3.org/TF/2004/WD-rdf-sparq/-query-20041012/.

Manola, F., and Miller, E. *RDF Primer*. http://www.w3.org/TR/rdf-primer/, W3C (2004).

The FOAF Project. http://www.foaf-project.org/.

U.S. Department of Labor, Bureau of Labor Statistics. *Standard Occupational Classification*. http://www.bls.gov/sox/soc_majo.htm.

Hobbs, J.R. and Pan, P. *An Ontology of Time for the SEmantic Web*. ACM Transactions on Asian Language Processing (TALIP): Special issue on Temporal Information Processing, vol. 3, No. 1, Mar. 2004, pp. 66-85.

Ma, L. et al. 2006. IBM Integrated Ontology Development Toolkit. http://www.alphaworks.ibm.com/tech/semanticstk.

Broekstra, J., Kampman, A., and van Harmelen, F. *Sesame: A generic architecture for storing and quering rdf and rdf schema*. In Proceedings of the 1st International Semantic Web Conference (ISWC2002).

Carroll, J.J., Dickinson, I., Dollin, C., Reynolds, D. Seaborne, A., and Wilkinson, W. *Jena: Implementing the semantic web recommendations*. Technical Report HPL-2003-146, Hewlett Packard Laboratories (2003).

Pan, Z., and Heflin, J. *DLDB: Extending relational databases to support semantic web queries*. In Volz, R., Decker, S., Cruz, I.F., eds.: Proceedings of the First International Workshop on Practical and Scalable Semantic Systems. vol. 89 of CEUR Workshop Proccedings. (2003).

Horrocks, I., Li, L., Turi, D., and Bechhofer, S. *The instance store: DL reasoning with large numbers of individuals*. In Proceedings of the Description Logic Workshop (DL 2004) pp. 31-40.

Fagin, R. *Fuzzy Queries in Multimedia Database Systems*. In Proceedings of the 17th ACM SIGACT-SIGMOD-SIGART Symposium on Principles of Database Systems, 1998.

Rishe, N. et al. *SemanticAccess: Semantic Interface for Querying Database*. In Proceeding of the 26th VLDB, pp. 591-594, Sep. 10-14, 2000, Cairo, Egypt.

Qui, Y. and Frei, H.P. *Concept Based Query Expansion*. In Proceedings 16th Int'l Conference on R&D in IR (SIGIR, pp. 160-169, 1993.

Lei, L. and Horrocks, I. *A Software Framework for Matchmaking Based on Semantic Web Technology*. In Proceedings of WWW2003, May 20-24, 2003, Budapest, Hungary.

Voorhees, E.M. *Query expansion using lexical-semantic relations*. In Proceedigns of the 17th ACM SIGR conference Dublin, Ireland, pp. 61-69, 1994.

Mano, H. and Ogawa, Y. *Selecting Expansion Terms in Automatic Query Expansion*. In Proceedings of SIGIR '01, ACM Press: New Orleans, LA, USA, 2001, pp. 390-391.

Mitra, M., Singhal, A., and Buckley, C. *Improving Automated Query Expansion*. In Proceedings of SIGIR '98, ACM Press: Melbourne, Australia, 1998, pp. 206-214.

Anyanwu, K., Maduko, A., Sheth, A. *SemRank: Ranking Complex Relationship Search Results on the Semantic Web*. In the Proceedings of the 14th International World Wide Web Conference (WWW2005), May 2005. Chiba, Japan, pp. 117-127.

Zhuge, H., Zheng, P. *Ranking Semantic-linked Network*, WWW2003, Budapest, Hungary, May 2003.

Li Ding et al., *Swoogle: A Search and Metadata Engine for the Semantic Web*, In Proceedings of the Thirteenth ACM Conference on the Information and Knowledge Management, Nov. 2004.

Ali, R.K. *AIS and Semantic Query*. Technical Report HPL-200-233, Hewlett Packard Laboratories, (2003).

Das, S. et al. *Supporting Ontology Based Semantic Matching in RDBMS*, In Proceedings of the 30th VLDB Conference, Toronto, Canada, 2004.

Noy, N.F. et al. 01. Creating Semantic Web contents with Protégé-2000.IEEE Intelligent Systems 16 (2001). pp. 60-71.

* cited by examiner

▽ O |  PROFESSION |
▷ O MANAGEMENT
▷ O BUSINESS_AND_FINANCIAL_OPERATIONS
▷ O COMPUTER
▷ O ARCHITECTURE_AND_ENGINEERING
▷ O LIFE_PHYSICAL_SOCIAL_SCIENCES
▷ O COMMUNITY_SOCIAL_SERVICES
▷ O LEGAL
▷ O ARTS_DESIGN_ENTERTAINMENT_SPORTS_AND_MEDIA
▷ O EDUCATION
▷ O HEALTHCARE_PRACTITIONER
   ▽ O HEALTHCARE_DIAGNOSING_AND_TESTING
      O CHIROPRACTER
     ▷ O DENTIST
      O DIETITIAN_AND_NUTRITIONIST
      O PHARMACIST
     ▽ O PHYSICIAN_AND_SURGEON
         O ANESTHESIOLOGIST
         O FAMILY_AND_GENERAL_PRACTITIONER
         O INTERNIST
         O OBSTETRICIAN_AND_GYNECOLOGIST
         O PEDIATRICIAN
         O PSYCHIATRIST
         O SURGEON
      O PODIATRIST
     ▽ O THERAPIST
         O AUDIOLOGIST
         O OCCUPATIONAL_THERAPIST
         O PHYSICAL_THERAPIST
         O RADIATION_THERAPIST
         O RECREATIONAL_THERAPIST
         O RESPIRATORY_THERAPIST
         O SPEECH_LANGUAGE_THERAPIST
      O OPTOMETRIST
   ▷ O HEALTH_TECHNICIANS

FIG. 1

INFORMATION RETRIEVAL FROM RELATIONAL DATABASES USING SEMANTIC QUERIES

This invention was made with Government support under Contract No.: H98230-04-3-0001 awarded by the U.S. Department of Defense. The Government has certain rights in this invention.

FIELD OF THE INVENTION

The present invention relates generally to the management of relational databases.

BACKGROUND OF THE INVENTION

Herebelow, numerals presented in square brackets—[ ]—are keyed to the list of references found towards the close of the present disclosure.

Relational databases are widely used today as a mechanism for providing access to structured data. However, there are a number of limitations presented by such databases that make them unsuitable for typical information-finding tasks of end-users.

First, SQL queries to these databases need to follow the schema of the tables. This means that the end-user needs to be aware of the schema and the layout of data across different tables. Even if there are good user interfaces that shield some of these details from the end-user, there may be a mismatch between the user's intended query and the database's schema. For example, assume that there is a database containing information about disaster aid workers located in different parts of the United States. A user may have a query about which aid workers are located in the Gulf Coast region of the United States; however the database tables may only have information about which towns and states aid workers are located in. Thus, although the database may contain the desired information, the user cannot get an answer to his query since the database does not know which towns and states are located in the Gulf Coast. Thus, the user is forced to re-frame his query based on the actual schema and contents of the database.

It is recognized that, in order to overcome the semantic gap between a user's query and the database's schema, a more flexible query mechanism is needed that returns all semantically relevant results present in the database. This may require the use of additional domain knowledge that would help bridge the gap between the query and the schema. Thus, in the above example, if the database had domain knowledge about which towns were located in the different regions of the US, then it could answer the user's query.

There are a number of potential sources of additional domain knowledge. For instance, this knowledge may be available in other specialized databases (e.g., GIS databases may contain location information about geographical features). With the recent growth of the Semantic Web [1], an increasing amount of knowledge in different domains is being expressed in ontologies. Accordingly, a need has been recognized in connection with exploiting this knowledge in ontologies to help databases answer semantic queries. In this vein, ontologies have the advantage of being based on a formal logic and thus support reasoning being done on them. They also tend to be more re-usable and sharable across different applications.

The Semantic Web envisions a world where loosely coupled, independently evolving ontologies provide a common understanding of terms between heterogeneous agents, systems, and organizations. In the past few years, different ontologies have been developed in various domains to capture relevant knowledge, e.g. the DOLCE upper ontology for Linguistic and Cognitive Engineering [2], the GALEN medical ontology [3], the National Cancer Institute Ontology [4], etc. These ontologies typically represent knowledge in description logics and are written in standard Semantic Web languages like OWL [5].

In view of the foregoing, a general need has been recognized in connection with optimally exploiting data and domain knowledge in a manner to impart even greater efficiency and functionality to complex information-finding tasks.

SUMMARY OF THE INVENTION

In accordance with at least one presently preferred embodiment of the present invention, there is broadly contemplated herein a system that uses both the data in a relational database and domain knowledge in ontologies to return semantically relevant results to a user's query.

Broadly contemplated herein, in essence, is a system that bridges the semantic gap between the queries users want to express and the queries that can be answered by the database using domain knowledge contained in ontologies. In accordance with a preferred embodiment of the present invention, such a system extends relational databases with the ability to answer semantic queries that are represented in SPARQL Protocol and RDF Query Language (SPARQL), an emerging Semantic Web query language. Particularly, users may express their queries in SPARQL, based on a semantic model of the data, and they get back semantically relevant results.

Also broadly contemplated herein is the definition of different categories of results that are semantically relevant to a user's query and an effective retrieval of such results.

In summary, one aspect of the present invention provides an apparatus for accessing and managing a relational database, the apparatus comprising: an arrangement for querying a relational database; and an arrangement for accessing query results from a relational database; the accessing arrangement acting to: access at least one ontology; extract domain knowledge from at least one ontology; and employ domain knowledge so extracted in obtaining query results from the relational database.

Another aspect of the invention provides a method of accessing and managing a relational database, the method comprising the steps of: querying a relational database; and accessing query results from the relational database; the accessing step comprising: accessing at least one ontology; extracting domain knowledge from at least one ontology; and employing domain knowledge so extracted in obtaining query results from the relational database.

Furthermore, an additional aspect of the invention provides a program storage device readable by machine, tangibly embodying a program of instructions executable by the machine to perform method steps for accessing and managing a relational database, the method comprising the steps of: querying a relational database; and accessing query results from the relational database; the accessing step comprising: accessing at least one ontology; extracting domain knowledge from at least one ontology; employing domain knowledge so extracted in obtaining query results from the relational database.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 illustrates a portion of a labor classification taxonomy.

DESCRIPTION OF THE PREFERRED EMBODIMENTS

Figure 2:
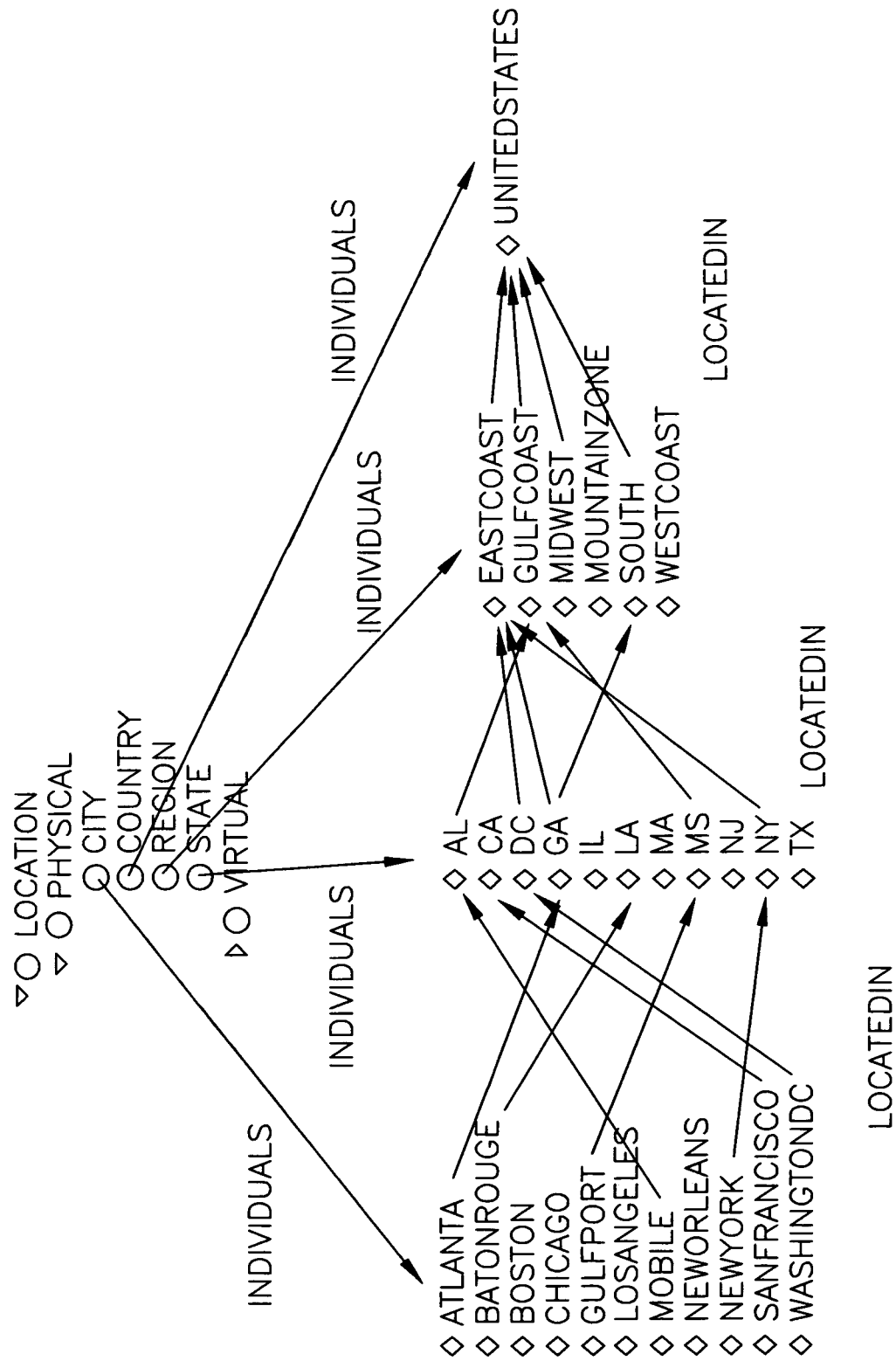
FIG. 2 illustrates a portion of a custom location ontology.

By way of general overview, in accordance with at least one presently preferred embodiment of the present invention, users will specify queries using SPARQL [6], a popular Semantic Web language for querying RDF graphs. The system then takes in a SPARQL query and uses a Description Logic reasoner to help infer semantically relevant results; this provides the return of more results than what is explicitly mentioned in the databases. Different categories of semantically relevant results can preferably be defined, e.g., direct results, inferred results and related results.

Ontologies describe semantic information about the terms (entities and relations) that may be present in the database. This semantic information includes the concepts that the term belongs to and its relations to other terms. In general, ontologies describe hierarchies of different kinds of concepts, the properties of these concepts, individuals that belong to the concepts and the relations between individuals. A system, in accordance with at least one embodiment of the present invention, preferably makes use of such ontologies to enrich the knowledge present in the database and thus reduce the semantic gap between the user's query and the database.

Besides describing the semantics of terms, ontologies also help in describing a semantic model of the data. They allow for the representing of complex inter-relations among different data elements at a higher, semantic level, and provide a layer of abstraction for the user that shields him/her from the specific E-R model used to store the data in the database. This makes it easier for users to browse the ontologies and frame queries using the terms (e.g., concepts, properties and individuals) in the ontology. The user is, thus, shielded from the actual layout of the data in different tables in the database and he can frame queries based on a semantic model of the data.

In order to enable semantic queries, a system in accordance with at least one embodiment of the present invention preferably reuses existing, standard ontologies. It also preferably makes use of custom ontologies that provide further semantic information about the data present in the database. There are also data-modeling ontologies that describe the semantic model of the data and relate terms used in the different standard and custom ontologies to one another. Finally, in order to convert between the relational model of data defined by the database and the semantic model of data defined in the ontologies, a system in accordance with at least one embodiment of the present invention preferably has a relational database wrapper that converts the tuples in the database to predicates that are based on terms defined in the ontologies.

The disclosure now turns to a more detailed discussion of semantic queries, as may be employed in connection with at least one presently preferred embodiment of the present invention.

Herein, the term "semantic query" is used to refer to database queries that are based on concepts, relations and individuals defined in an ontology and that return semantically relevant results. Such queries are based on the semantic model of the data expressed in the ontologies rather than the E-R model of the data present in a relational database.

Semantic queries can help reduce the semantic mismatch between the database and the user. For example, let it be assumed that a database regarding disaster-relief aid workers has detailed information about workers' professions (e.g., carpenter, civil engineer, gynecologist, surgeon, etc.). If a user has a query about all healthcare practitioners, then a conventional database would not be able to infer that a gynecologist and a heart surgeon are in fact medical workers and should be part of the answer. If, however, the database management system can handle semantic queries and there is a job ontology that describes different classes of professions as a hierarchy, then the system can indeed make the inference and return all semantically relevant results.

Ontologies describe a semantic model of data, expressed in the form of concepts (or classes), properties (or relations) and individuals (or instances). Depending on the kind of logic used to specify the ontologies, they may be able to specify the model of the data using different constructs and with different levels of expressivity. In accordance with at least one embodiment of the present invention, ontologies as specified in OWL DL [5] are preferably employed. OWL is emerging as a standard Semantic Web language for describing ontologies. OWL DL is an expressive sub-language of OWL, based on Description Logic (DL) that allows reasoning on it to be computationally complete and decidable.

Ontologies, typically, define hierarchies or taxonomies of concepts describing the different kinds of entities that may appear in a particular domain. These hierarchies, in OWL, are based on the "subclassOf" relationship, and they place the more general concepts at the top and the more specific concepts at the bottom. Each concept is associated with properties that relate them to other concepts. There are two kinds of properties: datatype properties, whose range is a data value, and object properties, whose range is a concept (or a logical expression based on concepts). The ontologies can specify restrictions on the number of properties a concept may have and the values of these properties. Finally, the ontologies define individuals belonging to one or more concepts. Individuals can have properties that relate them to other individuals.

OWL is based on RDF [7], wherein all knowledge is expressed in the form of "triples," containing a subject, a predicate and an object. OWL ontologies can thus be represented as RDF graphs, where the nodes are concepts and instances, and the links are properties.

One of the key characteristics of ontologies is their relative independence of particular applications, i.e. an ontology includes relatively generic knowledge that can be reused by different kinds of applications/tasks. Ontologies are often written with the view of sharing the knowledge across multiple applications. Data models in ontologies are extensible and can evolve with time, relatively easily. Conventional data models in databases, on the other hand, are often specific to applications.

The more conventional relational data models (like SQL) typically specify the structure and integrity constraints of data sets. Ontology models, however, describe the semantics of the data in formal logic. Ontologies, written in description logics, are also more expressive than relational models of data. They can, for instance, specify hierarchies of concepts and properties, and define different kinds of restrictions on the domain and range of properties.

Semantically relevant results are desired from semantic queries. In order to return semantically relevant results, it is important to define which results of a query qualify as "semantically relevant." Herein, three types of semantically relevant results are defined, based on how these results are obtained and their relationship to the semantic query: direct results, inferred results and related results.

Direct results are obtained directly from the database tables; i.e., they involve only results that are explicitly listed in the database tables. For example, consider again the database containing information about disaster aid workers located in different parts of the United States. The direct results of a semantic query for aid workers in New Orleans contain only those aid workers who are explicitly listed as being located in New Orleans in the database. Most standard database management systems and query languages support the return of direct results.

Inferred results are those that can be inferred using the information that is explicitly listed in the database and the domain knowledge in the ontologies. The inference is done using Description Logic, which is the most common type of reasoning done on ontologies in the Semantic Web. For example, the inferred results of a semantic query for aid workers in the Gulf Coast contains all aid workers in Louisiana, Mississippi, Alabama and other states that form part of the Gulf Coast. Thus, although, the database itself had no information about "Gulf Coast", the semantic query can return relevant results. In this case, the inference is made possible with the help of location ontologies that describe which regions a state is located in.

"Related results" are obtained using data in the database tables and a definition of similarity of concepts and individuals based on the data model in the ontologies. It includes results that do not strictly match the user's query, but may still be similar to the actual answers and hence, may also be semantically relevant. For example, the related results of a query for aid workers in New Orleans may also return results from other towns in the state of Louisiana close to New Orleans. Such an expanded result set is especially useful if there were no or very few aid workers in New Orleans itself.

These related results are obtained by discovering which cities of towns are similar to New Orleans. In this case, similarity is interpreted as location proximity, so the semantic query is expanded to include cities or towns that are close to New Orleans. In order to return similar or related results in general, a definition of "similarity" of any two concepts or individuals is needed. Herebelow, there are proposed various heuristics that can be used to generate more general queries for producing results that are similar to those produced by the original query. These heuristics make use of domain knowledge in the ontologies.

There are, in general, two kinds of ontologies that are required for answering semantic queries. First, there are "domain ontologies" that provide additional knowledge about the entities, relations and instances in the database. Secondly, there are "data-modeling ontologies" that describe the semantic model of the data described in the database, and that may reuse the concepts described in the domain ontologies. Some of these ontologies may be standard ones; others may have to be defined for the database in question.

For example, the schema of a table that can be used for describing different disaster-relief aid workers is in Table 1. This table gives personal details about aid workers as well as their experience and education levels in dealing with disasters. Provided below is a discussion of the kinds of ontologies that may preferably be used to allow semantic queries on a table such as the one shown in Table 1.

TABLE 1

Schema of table describing disaster-relief aid workers

| Key | Name | Data Type | Length |
|---|---|---|---|
| Y | ID | INTEGER | 4 |
|   | NAME | VARCHAR | 30 |
|   | CITY | VARCHAR | 20 |
|   | STATE | VARCHAR | 2 |
|   | PROFESSION | VARCHAR | 40 |
|   | AGE | INTEGER | 4 |
|   | SEX | CHARACTER | 1 |
|   | DISASTER_PREP_COURSE_TAKEN | VARCHAR | 20 |
|   | DISASTER_EXP_LEVEL | VARCHAR | 10 |

In order to obtain semantic information, standard domain ontologies that describe some of the entities and relations in the schema can preferably be reused. For example, the term Person is defined by a number of standard ontologies. One such ontology is the Friend-of-a-Friend ontology (FOAF [8]), which describes a number of properties of people like their name, phone number, homepage, organization, etc. The term Profession is described in different labor taxonomies. The US Department of Labor, for instance, provides the Standard Labor Classification [9] that classifies workers into various occupational categories. This classification has 23 major groups of occupations, 96 minor groups, and 449 broad occupations. Each broad occupation includes detailed occupational information such as job duties, skills, education, or experience. A portion of this taxonomy is shown in FIG. 1. There are also various efforts to define standard ontologies that include concepts and properties related to time and space (such as [10]).

In addition to the standard domain ontologies, custom ontologies can also be defined. These custom ontologies can define concepts, properties and individuals that are required for the specific application. In the present example, there can be defined a custom location ontology that, in particular, describes different location in the Gulf Coast region of the US, since this is relevant to the application at hand. A portion of such a custom location ontology is shown in FIG. 2. This ontology defines various concepts like State, City and Region. It also includes some individuals (instances) of these concepts. For example, it states that the individuals Atlanta, BatonRouge, etc. belong to the concept City; individuals AL, CA, etc. belong to the concept State. Finally, it defines the locatedIn property between different locations. For example, it states that Atlanta is locatedIn GA and GulfCoast is locatedIn the UnitedStates (not all defined relations are shown in FIG. 2).

In the present disaster-relief example, the FOAF person ontology and the Standard Labor Classification labor ontology have been reused. A "person ontology" has been defined that extends the FOAF ontology to describe additional properties of Person not defined in FOAF. Generally, a disaster relief ontology has been constructed that describes concepts and properties specific to the disaster relief scenario at hand. The custom location ontology (as shown in FIG. 2) has also been used.

In order to reuse concepts from the different domain and application specific ontologies effectively, a data-modeling ontology is preferably employed that provides an overall semantic model of the data present in the database. These data-modeling ontologies preferably pull in appropriate concepts from the standard ontologies, and relate them to one another. In addition, the data-modeling ontology can define concepts and properties that are not defined by any of the standard ontologies, and that may be specific to the database at hand.

Figure 3:
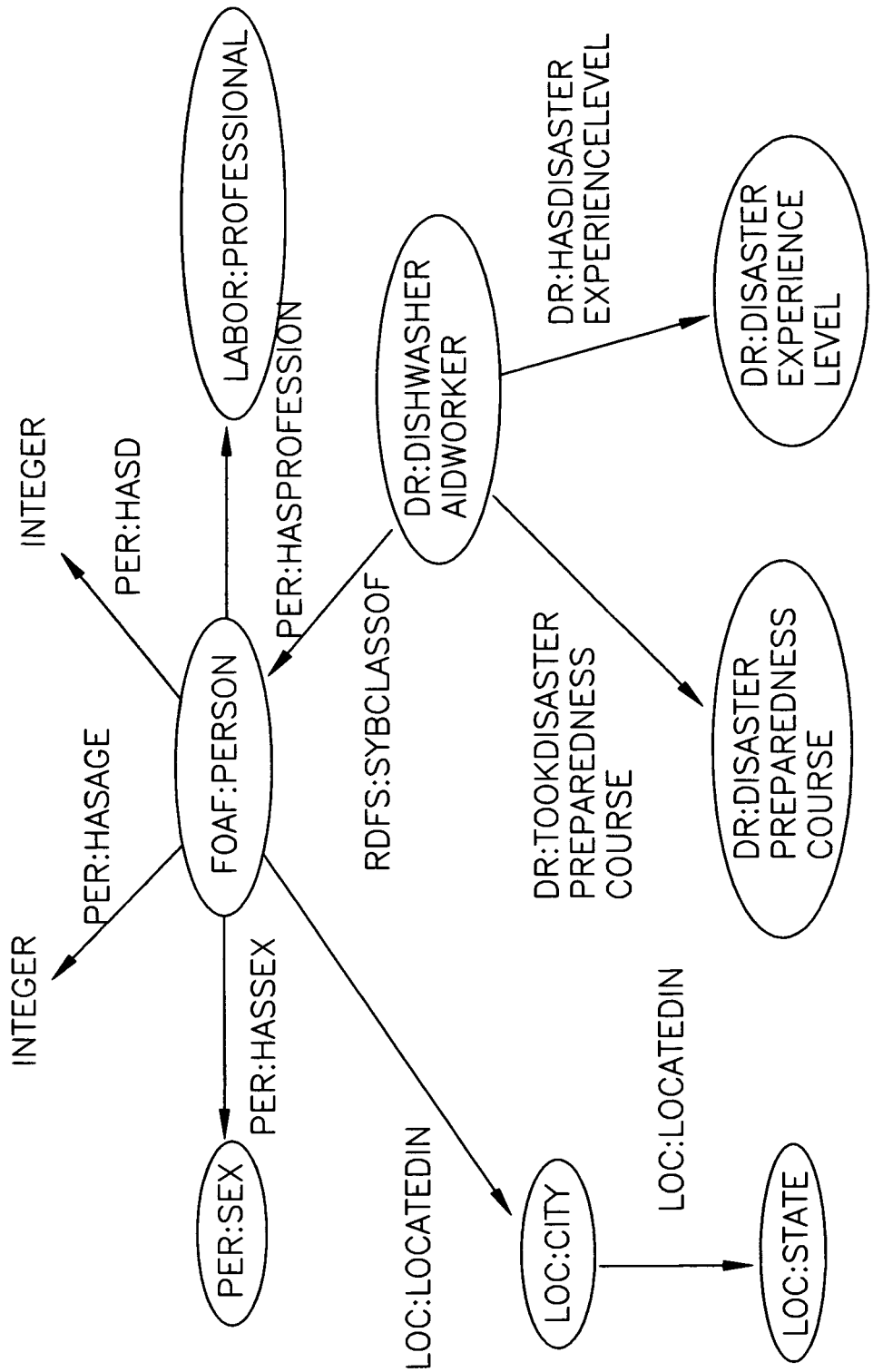
FIG. 3 illustrates a semantic model of data provided by a data-modeling ontology.

A data-modeling ontology, in a particularly preferred embodiment of the present invention, uses terms defined in the different ontologies and describes a semantic model of the data that is loosely based on the schema of the database. This semantic model is shown in FIG. 3. Some of the concepts in the semantic model are foaf:Person. labor:Profession, loc:City, loc:State, per:Sex, dr:DisasterAidWorker, dr:DisasterExperienceLevel and dr:DisasterPreparednessCourse. The concept dr:DisasterAidWorker is defined to be a sub class of foaf:Person, and hence inherits all the properties and restrictions defined on t. The concepts in the semantic data model are related by various object properties like per:hasProfession, loc:locatedIn, etc. The concept foaf:Person also has two datatype properties defined on it, per:hasID and per:hasAge, whose ranges are integers. It also defines individuals of some classes; for instance, it defines two individuals of the class per:Sex, viz. per:Male and per:Female.

The prefixes before the terms indicate the namespace within which the concept is defined and also help to indicate the ontology where the concept is defined. For instance, the dr namespace corresponds to the disaster relief ontology and per namespace corresponds to the person ontology. Each concept, property and individual in an ontology is actually represented by a URI, and the prefix acts as a shorthand for the scheme and hierarchical part of the URI. For instance, the fall URI of the Person concept is http://xmlns.com/foaf/0.1/Person and the prefix foaf:acts as shorthand for http://xmlns.com/foaf/0.1/.

Since an ontology model is more expressive than an ER model, it can capture more semantic information about the data, as well as additional constraints on the values that different fields can take. For instance, the value of the per:hasSex property for any foaf:Person instance has to be per:Male or per:Female (which are the declared instances of the concept per:Sex). In the database, however, the sex field is just represented as a character. Similarly, the values of per:hasprofession, loc:hasCity and loc:hasState properties can only be those individuals that have been declared to be of type labor:Profession, loc:City or loc:State (or one of their subclasses). In the database, however, these fields are just represented as arbitrary VarChars. There is no further semantic information attached to these VarChars. The same is true for the concepts dr:DisasterPreparednessCourse and dr:DisasterExperienceLevel and the properties that have these concepts as ranges.

Another example of additional semantic information that can be specified by the ontologies is in the definition of properties. In the above example, the property loc:locatedIn is defined to be a transitive property. This means that if a person p is loc:locatedIn a city c and the city c is described to be loc:locatedIn a state s, then the p can be inferred to be loc:locatedIn state s. Also, now if state s is described, in the same ontology or in a different ontology, to be loc:locatedIn region r, then p can be inferred to be loc:locatedIn region r as well. Similarly properties can also be defined to be functional, inverse functional and symmetric, leading to different kinds of inferences and constraints on the concepts and individuals related by these properties.

In the ontology, each concept, property and individual is represented by a unique URI. So, for instance, the city Springfield in the state of Illinois has a different URI from the city Springfield in the state of Missouri. One may have the URI http://ontologies.ibm.com/locations/usa/
il.owl#Springfield and the other may have the URI http://ontologies.ibm.com/locations/usa/
mo.owl#Springfield.

As a result, there is no ambiguity between these two towns in the ontology.

The data-modeling ontology also serves as an integrating ontology by defining relations between terms used in different domain ontologies, particularly if they use different terms to refer to the same concept or property. For example, one domain ontology might have a concept called "Person" and another may have one called "Human". The data-modeling ontology should preferably define a relation between these two concepts, stating that they are equivalent, or that one is a subclass of the other.

In order to query the semantic model of the data, a query language is preferably employed that can describe RDF graph patterns. In accordance with a preferred embodiment of the present invention, SPARQL [6] is used for this purpose. SPARQL is emerging as a popular language for querying RDF graphs; it is based on matching graph patters and can be used to extract information from RDF graphs as well as extract subgraphs.

SPARQL queries can refer to concepts, properties and individuals described in the ontologies. It includes one or more constraints that are written in the form on triples, containing a subject, predicate and object. For example, a SPARQL query for disaster aid workers who are located in the Gulf Coast region could appear as follows:

SELECT ?x WHERE (?x rdf:type dr:DisasterAidWorker)

(?x loc:locatedIn loc:GulfCoast)

As mentioned earlier, depending on the amount of information used in the ontologies, there can be three types of query results: direct, inferred and related.

Direct results (i.e. results which are explicitly listed in the database tables) can be obtained using a standard query language like SQL on the database. Since obtaining direct results is a fairly trivial or routine exercise, more detailed discussion would not appear to be warranted.

Inferred results, on the other hand, may preferably be obtained with the help of a description logic reasoner. The reasoner allows for inferring that a certain entity is part of the result set, even though it may not be explicitly stated in the database. The reasoning is based on domain knowledge in the ontologies and the set of asserted facts in the database.

Turning more specifically to the description logic reasoner, it is to be noted that Description Logic (DL) is generally used to represent and reason about the terminological knowledge of an application domain. It is mainly used for subsumption and classification reasoning. In DLs, there are two kinds of facts: "TBox" (terminological box) and "ABox" (assertion box). In general, the TBox contains sentences describing concept hierarchies and relations-between concepts. The ABox contains "ground" sentences stating where in the hierarchy individuals belong (i.e., relations between individuals and concepts) as well as relations between individuals.

There is a direct correspondence between OWL constructs and DL. OWL axioms (subclass axioms, subproperty axioms, domain and range restrictions, etc.) correspond to TBox knowledge, and OWL facts (type assertions, property assertions, individual equality, individual inequality, etc.) correspond to ABox assertions.

A DL reasoner that may preferably employed, and that has shown very favorable results, is Minerva[11]. Minerva is a scalable, efficient RDBMS-based DL reasoner. It performs inferences on a kind of DL called Description Horn Logic (DHL). DHL completely covers RDF semantics and the majority of OWL semantics. Minerva performs TBox reasoning using any DL reasoner, and it performs ABox reasoning using a rule-based engine. The inference for OWL ontologies restricted by DHL is sound and complete A key feature of Minerva is that it precomputes all inferences and stores the basic asserted facts as well as the inferred facts in a backend relational database. Hence, queries to Minerva are fast since no description-logic reasoning is done at query time. Also, since Minerva uses a relational database to store all the asserted and the inferred facts as opposed to having everything in main memory, it is more scalable.

Since Minerva uses a rule-engine to do ABox inference, it allows efficient assertion and retraction of ABox facts. Thus, for example, one can add new individuals, type assertions and property assertions to the knowledge base, and Minerva can efficiently compute all new facts that can be inferred from the assertions. Similarly, when various facts are retracted from the knowledge base, Minerva can remove all facts that were inferred using this retracted fact, and that cannot be inferred from all remaining asserted facts in the knowledge base. Thus, Minerva can handle a dynamic ABox knowledge base.

Minerva cannot, however, efficiently handle changes to the TBoxes in the knowledge base. Any such change requires a recomputation of all inferences. However, this is not a serious limitation in many domains. Often, the set of TBoxes change far less frequently than the set of ABoxes. The descriptions of concepts normally do not change as often as the descriptions of individuals. Hence, the recomputation of all inferences upon a change in the TBox does not have to occur very frequently.

"Related results" represent the third type of results of a semantic query. Related results are those that are not explicitly asserted or can be logically inferred, but also those that are closely related to actual results, and which may, hence, also be semantically relevant. Returning related results is especially useful if the original query was too specific and returned few direct and inferred results.

In order to decide which results are related to the query, it is highly desirable to evaluate how similar two entities (concepts or individuals) are. This would allow for the ranking of related results based on their similarity to the actual results.

In general, there is no precise way of determining what constitutes relatedness between entities, and how similar two entities are. However, the ontologies, as employed in the context of at least one embodiment of the present invention, provide a framework within which one can define relatedness in different ways. In particular, relatedness may preferably be defined in terms of the different kinds of hierarchies defined in the ontologies as well as in terms of the concepts different individuals belong to.

In order to obtain related results, one may preferably modify or expand the original semantic query to include more general terms or relations. In this context, various query generalization strategies may preferably be used to generate queries that might return similar results.

By way of such query generalization strategies, it is to be noted that a SPARQL semantic query contains one or more constraints that the results must satisfy. These constraints are in the form of triple patterns, containing a subject, a predicate and an object. One or more fields in a triple pattern may be a variable.

The different query generalization strategies take certain kinds of constraints in the SPARQL query and replace them with more general constraints. Herebelow there are discussed some of the strategies that could preferably be employed to produce semantically similar results.

A first strategy, subsumption hierarchy based constraint generalization, makes use of the concept hierarchy defined in the ontology. The concept hierarchy is based on the OWL subClassOf relationship that declares that one concept is subsumed by another. Since a concept may have multiple subClassOf properties defined on it, the concept hierarchy is, more generally, a concept lattice.

In this strategy, if the object in a triple in the SPARQL query is a concept in the ontology, then that concept is preferably replaced with the immediate superclasses of the concept, as defined by the ontology.

In other words, this strategy replaces any constraint of the form (S P <concept>)

with (S P <superclass of concept>), where S and P are any subject and predicate. If the concept has more than one superclass, then this strategy results in more than one general query being generated.

For example, if the original semantic query was for disaster aid workers whose profession is an individual of type Surgeon, the generalized query is for disaster aid workers whose profession is an individual of type Physician_and_Surgeon (which is the immediate superclass of Surgeon as shown in FIG. 1). This generalized query returns aid workers whose profession may be Surgeon, Anesthesiologist, Psychiatrist, Pediatrician, or any of the other subclasses or descendents of Physician_and_Surgeon In this example, the original query is:

SELECT ?x WHERE (?x rdf:type dr:DisasterAidWorker)

(?x per:hasprofession ?y)

(?y rdf:type labor:Surgeon)

The generalized query after applying this strategy is:

SELECT ?x WHERE (?x rdf:type dr:DisasterAidWorker)

(?x per:hasprofession ?y)

(?y rdf:type labor:Physician_and_Surgeon)

In a second strategy, transitive-property hierarchy based constraint generalization, some properties are defined to be transitive in the ontology. For example, the locatedIn property may be transitive. If (x locatedIn y) and (y locatedIn z) are two property assertions, then the reasoner infers that (x locatedIn z) is also true, where x, y and z are individuals defined in the ontology.

Based on the transitive property, different individuals may be arranged in a hierarchy (or more generally, a lattice). For example in FIG. 2 (location ontology), various cities are described to be located in states; states are located in regions and regions are located, in countries. The locatedIn property thus forms a lattice, a portion of which is shown in FIG. 2.

In this strategy for constraint generalization, if the predicate in a triple is a transitive property and the object is an individual defined in the ontology, then the object individual is preferably replaced with individuals that are immediately above it in the lattice formed by the transitive property.

In other words, this strategy replaces any constraint that is of the form (S <transitive property> <individual>)

with (S <transitive property> <individual immediately higher in the lattice>).

For example, if the original semantic query is for disaster aid workers who are located in BatonRouge, then the generalized semantic query is for disaster aid workers who are located in the state of LA (Louisiana), which is the individual immediately above BatonRouge in the locatedIn lattice (FIG. 2). The generalized query returns aid workers who are located in any town in the state of Louisiana, and not just BatonRouge.

In this example, the original query is:

SELECT ?x WHERE (?x rdf:type dr:DisasterAidWorker)

(?x per loc:locatedIn loc:BatonRouge)

The generalized query after applying this strategy is:

SELECT ?x WHERE (?x rdf:type dr:DisasterAidWorker)

(?x loc:locatedIn loc:LA)

In a third strategy, individual-type based constraint generalization, an individual defined in the ontology can belong to one or more concepts. The main idea behind this strategy is that an individual in a constraint can be replaced by any other individual that belongs to at least one of these concepts.

In this strategy, if the object of a triple pattern in the SPARQL query is an individual, then the object is replaced with a new variable that has the same type as the individual. In other words, this strategy replaces any constraint of the form (S P <individual>)

with (S P ?similarIndividual)

(?similarIndividual rdf:type <class of individual>)

In effect, this allows the individual (individual) to be replaced by any other individual (?similarIndividual) that belongs to at least one of the concepts (class of individual) that the original individual belongs to. If the original individual belongs to more than one concept, then this strategy generates more than one general query.

For example, if the original semantic query is for disaster aid workers whose sex is Male, then the generalized query is for disaster aid workers whose sex is anything that is of type Sex (which is the type of the individual Male). In this case, the generalized query returns disaster aid workers whose sex is Male or Female.

In this example, the original query is:

SELECT ?x WHERE (?x rdf:type dr:DisasterAidWorker)

(?x per:hasSex per:Male)

The generalized query after applying this strategy is:

SELECT ?x WHERE (?x rdf:type dr:DisasterAidWorker)

(?x per:hasSex ?similarIndividual)

(?similarIndividual rdf:type per:Sex)

Generally, the three strategies just described consider only some notions of relatedness that can be applied to generate more general queries. Applying these strategies repeatedly generates queries that are more and more general than the original query.

The query generalization algorithm works by repeatedly applying the above strategies until a certain pre-specified number of results are obtained. It starts off with the basic query and applies each of the strategies to get more general queries. Some of the strategies may result in more than one general query being generated. These queries are then posed to the system and the results collected. In the next iteration, it applies the same strategies to each of these general queries to get the next level of more general queries. The process goes on until a certain prespecified number of results are obtained. These results are then ranked based on how far they are from the root of the tree (i.e. how many generalizations were performed on the basic query to obtain the query that generated the results). They are then presented to the user while also describing what generalizations were performed on the original query to obtain the results.

Figure 4:
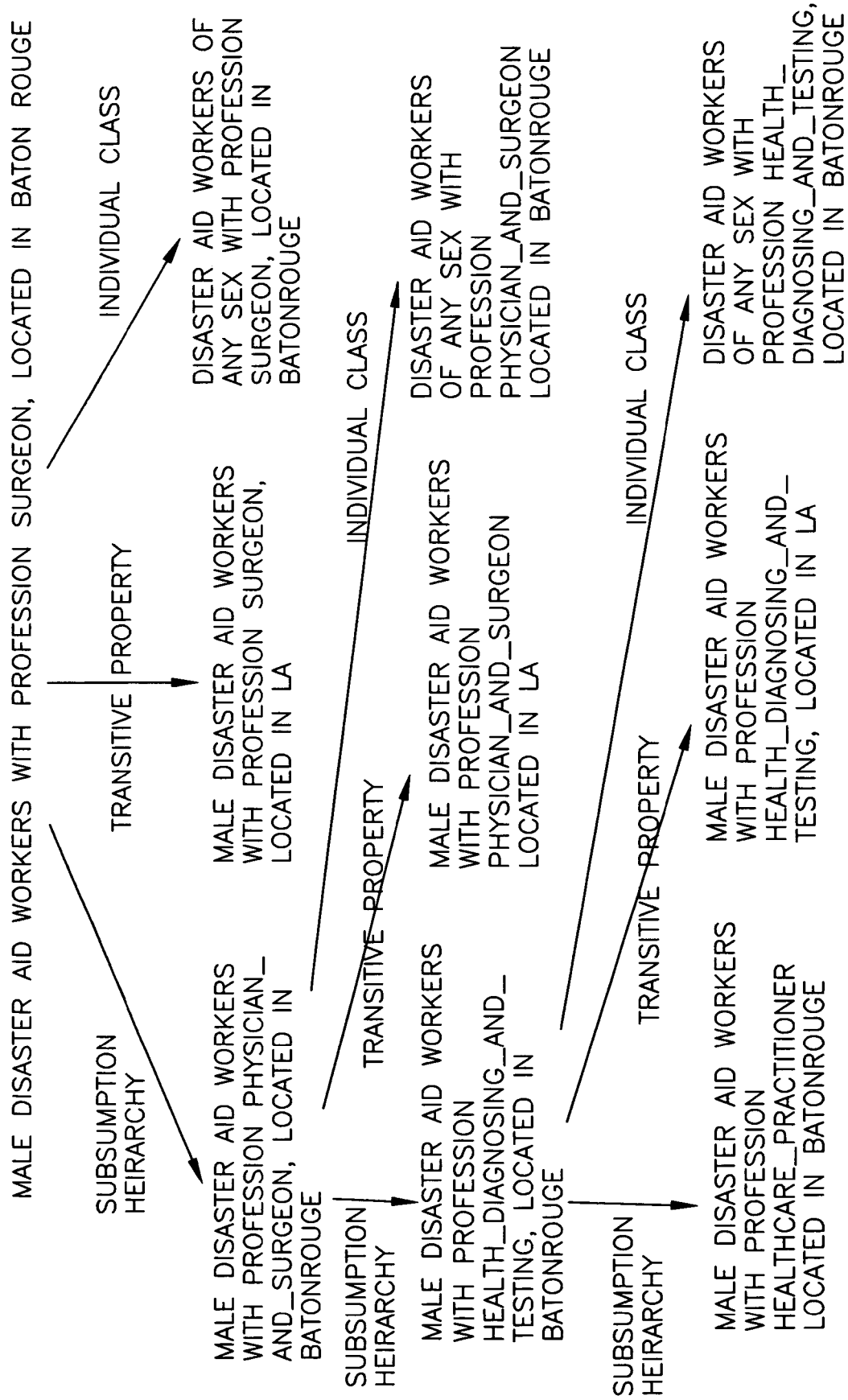
FIG. 4 illustrates a portion of a query tree obtained by running a query generalization algorithm on a sample query.

FIG. 4 shows a portion of the query tree obtained by running the query generalization algorithm on a sample query. In this example, the original query for Male Disaster Aid Relief workers with profession Surgeon, located in Baton Rouge, is generalized several times using the different strategies described above. In progressing farther from the original query at the root, there is a decrease in the similarity of results. FIG. 4 shows the queries represented in natural language, as opposed to SPARQL, for the purposes of readability.

Figure 5:
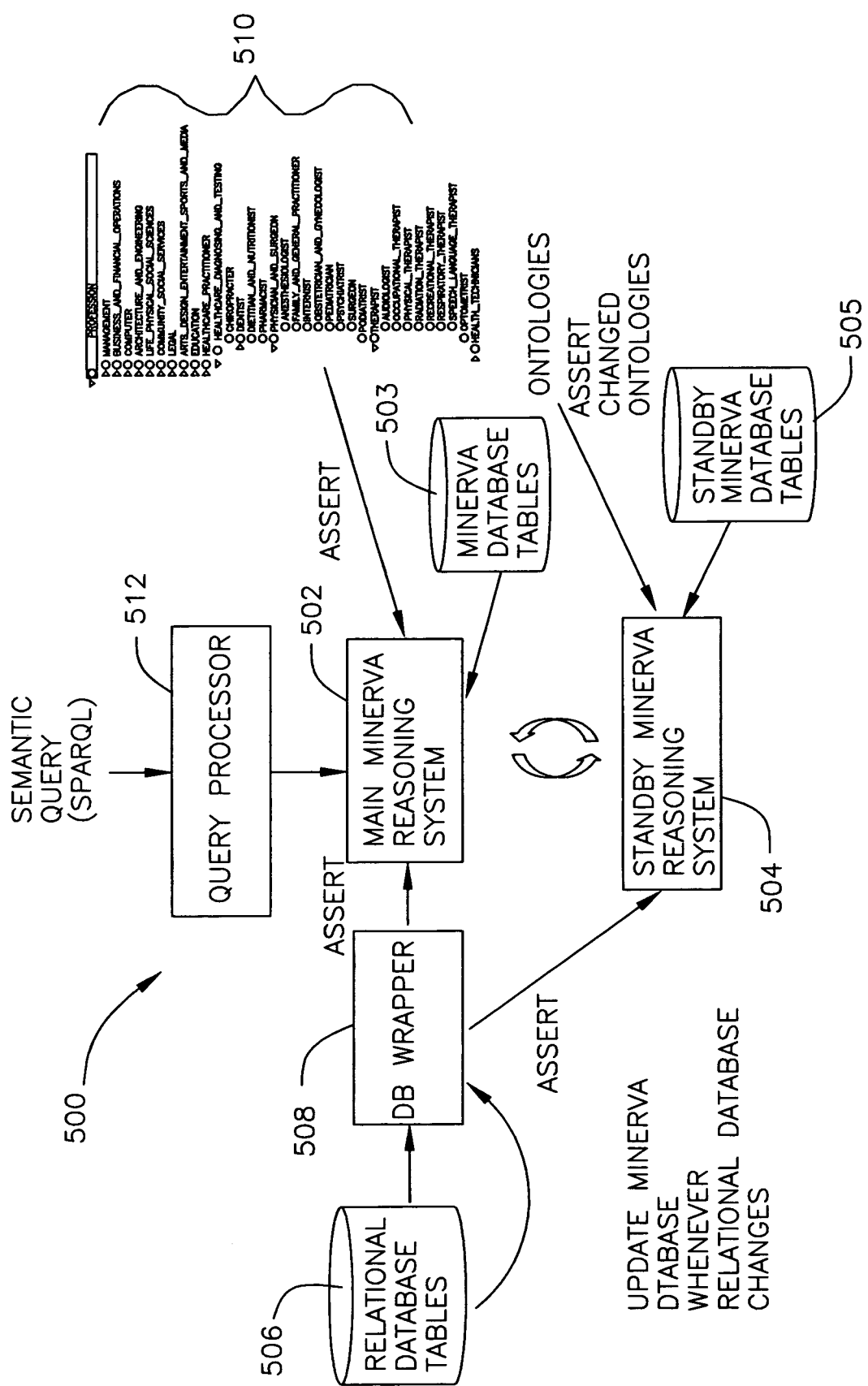
FIG. 5 illustrates a system architecture which allows posing semantic queries in SPARQL on a relational database.

FIG. 5 illustrates a system architecture 500 which allows posing semantic queries in SPARQL on a relational database. The architecture preferably contains two Minerva reasoning systems (a primary 502 and a standby 504) along with the databases they use for storing the asserted and inferred facts (503 and 505, respectively). Architecture 500 also preferably contains the original relational database (506) storing the data of interest. This database (506) interacts with the Minerva system 502 through a wrapper 508 that translates the data in it into triples that can be processed by Minerva 502. Then there are ontologies 510 that describe the semantic model of the data as well as provide additional domain knowledge. Finally, there is a query processor 512 that takes in semantic queries in SPARQL and obtains the different kinds of semantically relevant results from the Minerva system.

Preferably, the architecture 500 isolates the original relational database (506) from the semantic query system as far as possible. If the relational database in question is part of a different system as well, it may receive queries as well as insertions, deletions and updates from other components not shown in FIG. 5. Thus, in order to minimize the disruption to the "other" system to which a relational database belongs, different databases may preferably be used for storing the original relational data and for storing the semantic facts that are inferred and accessed by the Minerva reasoning system.

Preferably, there are 3 main phases of operation of a system in accordance with a preferred embodiment of the present invention: initialization, normal operation, and standby switching.

In a first phase of initialization, all the relevant ontologies are preferably loaded into the primary Minerva system. The ontologies include TBoxes and some ABoxes. Next, all the entries in the original relational database tables are preferably asserted into the primary Minerva system. This assertion occurs through a DB wrapper that converts the original database rows into ABoxes. The wrapper is aware of the ER schema of the original database and knows the mappings between entities, relations and data items in the database to concepts, properties and individuals in the ontologies. It converts the rows in the tables to ABoxes (type and property assertions on ontology individuals) and asserts these ABoxes into the Minerva system.

The system also preferably ensures that the Minerva system is kept up-to-date with the relational database. It creates triggers on the original database, so that any changes in the tables result in a notification to the DB Wrapper, which then updates the Minerva system. As mentioned earlier, the Minerva reasoner allows efficient assertion and retraction of ABox facts, and can, thus, handle updates to the original relational database efficiently.

In the normal operation phase, the system can answer semantic queries. The Query Processor takes in queries in SPARQL and poses them to the Minerva system to get direct and inferred results. It also does query generalization and obtains a certain pre-specified number of related results. In this phase, the system can also handle changes to the relational database. The triggers set of the database cause the wrapper to be notified of any inserts, deletes or updates on the original database tables. The wrapper then performs appropriate assertions and retractions on the Minerva knowledge base.

The standby switching phase is preferably invoked if the TBoxes in the ontologies change. As mentioned earlier, Minerva cannot handle changes to the TBoxes in the knowledge base efficiently. Any such change requires a recomputation of all inferences and can take a few minutes for large ontologies. In order to prevent the system from being unresponsive to queries while the inferences are being done, a standby Minerva system is preferably employed for performing the recomputation. Whenever TBoxes in the ontologies change, the standby system goes through the initialization phase described earlier (all the facts in the ontologies and the database are asserted in it). Once the standby Minerva system is initialized, the two Minerva systems are switched. The standby system now becomes the primary one and answers all semantic queries.

The TBoxes in the ontologies need to change only when the concept or property definitions have to be inserted, modified or deleted. For many systems using ontologies (including our own), the set of TBoxes is fairly stable and does not change frequently. Hence, the standby switching does not occur very frequently either.

In experimentally evaluating a system in accordance with at least one embodiment of the present invention, a semantic query system was developed based on the architecture described hereinabove. The performance of the semantic query system was then evaluated in the context of a "disaster relief" scenario as described heretofore. The relational database in this case included various tables describing aid workers, victims and various resources used in the disaster relief process (including the table shown hereabove as Table 1). A number of OWL ontologies were also used to provide domain knowledge and to describe a semantic model of the data (including the different ontologies described in hereinabove). The custom ontologies were built using the ontology authoring tool, Protégé [28]. All of the experiments were performed on a 2 GHz Intel Pentium 4 machine with 2 GB of RAM. The RDBMS used for both the original and the Minerva databases was DB2 v8. All the databases were located in the same machine.

An objective was to measure the effect that the size of the original database has on the time needed to initialize the semantic query system and on the time needed to answer semantic queries. The original database was artificially populated with values from various dictionaries for the different columns in the different tables.

A set of 5 SPARQL queries was used for the purposes of testing. These queries contained between 2 and 6 constraints and produced different numbers of direct and inferred results. In case the number of direct and inferred results was less than 50, then the semantic query system was also configured to produce related results. The query generalization process for producing related results was continued until at least 50 results were produced, or no further related results could be produced.

The ontologies used for testing contained about 400 concepts, 120 properties and 500 individuals. The Minerva database was initialized with these ontologies, as well as with data from the original relational database.

Figure 6:
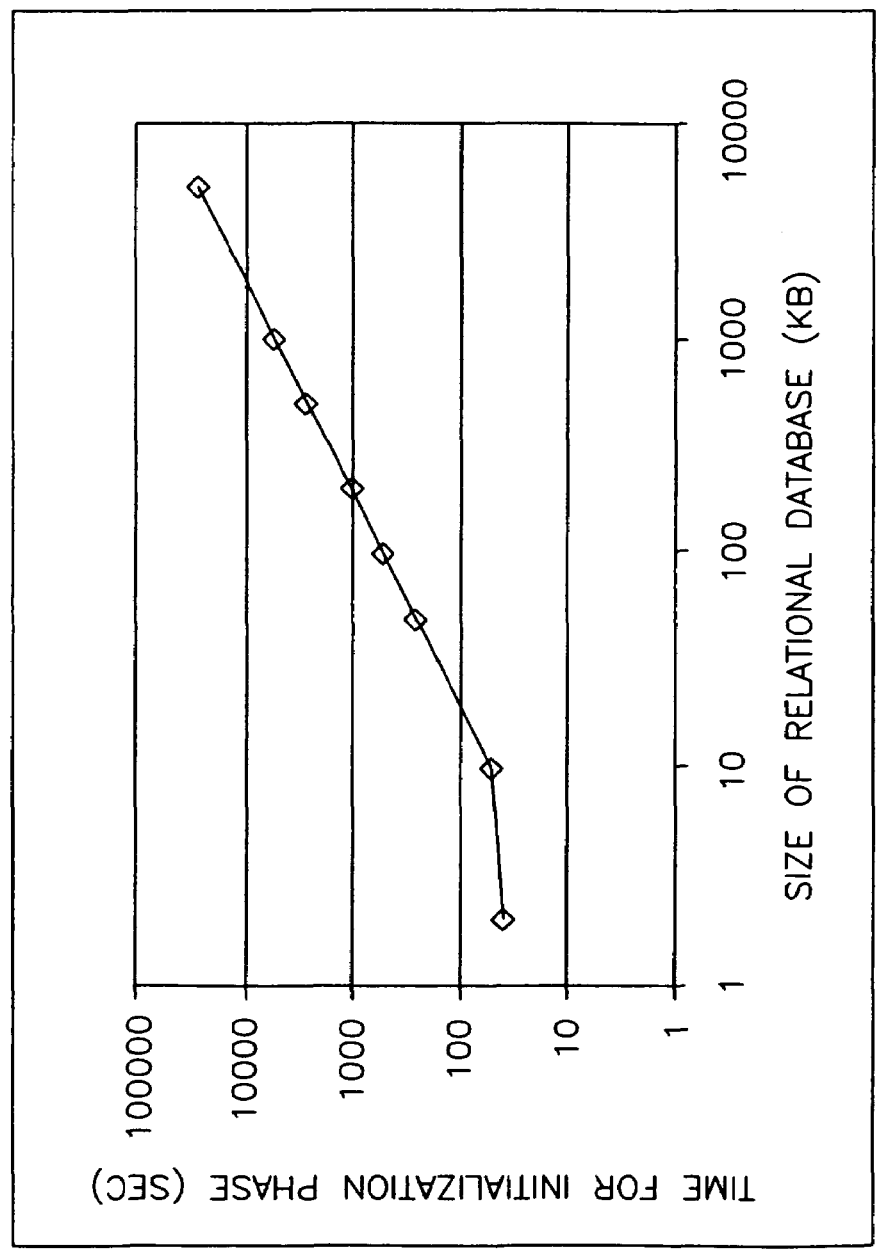
FIG. 6 shows experimental results relating initialization time for initialization to the size of a relational database.
Figure 7:
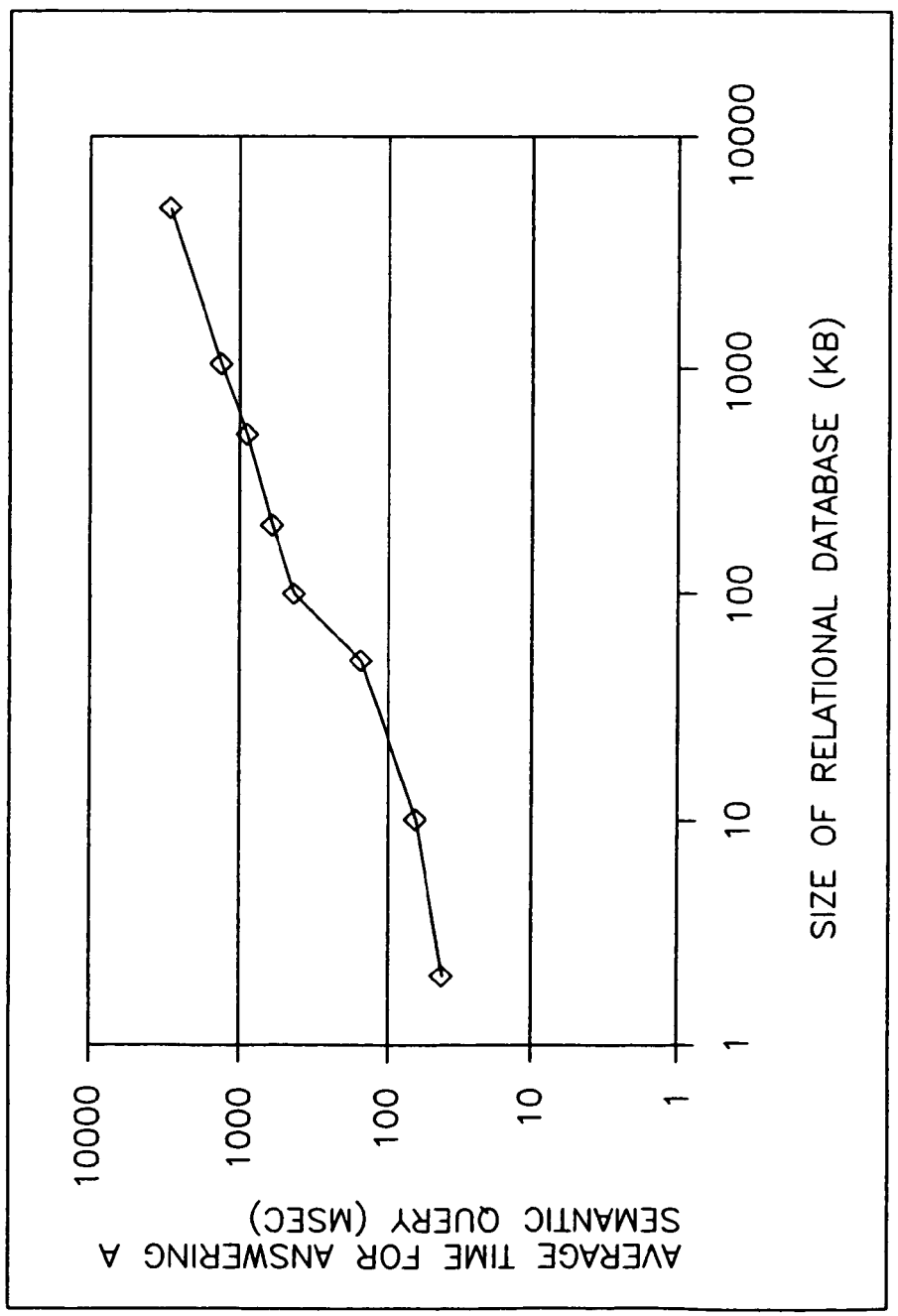
FIG. 7 shows experimental results relating the average time for answering a semantic query to the size of a relational database.

FIGS. 6 and 7 show the performance results for different sizes of the original database ranging from 2 KB to 10 MB. Note that the size presented here is the size of the relevant tables in the database. DB2 creates a number of tables for database administration and maintenance automatically with each database; the size of an "empty" DB2 database with no relevant data is about 32 MB.

The time for the initialization phase includes a constant time for loading the ontologies and a variable time for loading all the facts in the relational database as ABox assertions. The average time for answering a semantic query is the average time it took to answer a test set of 5 SPARQL queries and producing at least 50 direct, inferred and related results.

As can be seen from FIG. 6, the time for initialization grows linearly with the size of the relational database. This time for initialization also reflects the time it would take to recomputed all the inferences if the TBox of the ontology changed and the standby switching phase has to be invoked. The actual time required for performing the initialization can become large for large database sizes. This problem can be partially solved by moving to more powerful machines for hosting the databases. Future work can involve an approach where not all the data in the database goes into the semantic Minerva knowledge base, where only those tables or columns which users may find useful in-querying using semantic queries may be loaded into the Minerva databases. The rest of the data would then be queried using standard SQL queries on the original relational database.

From FIG. 7, one may see that the average time for answering a semantic query also grows linearly, for the most part, with the size of the relational database. This is a good sign for the scalability of the system for supporting semantic queries.

In recapitulation, there has been presented herein an approach for enabling users to extract information from relational databases using semantic queries. This approach used domain knowledge in ontologies to help reduce the semantic gap between the queries users want to express and the queries that can be answered by a relational database. Users express semantic queries in SPARQL and get back different categories of semantically relevant results (direct, inferred and related). The performance of the system was tested, and it was found that the time for initializing the system and for answering semantic queries grows linearly with the size of the relational database.

Future work could include experimentation with other strategies for obtaining related results. The system could also be tested on other kinds of databases and ontologies, as well as with actual users, to get a better understanding of which results may qualify as semantically relevant results.

By way of even further appreciating the unique and novel features associated with at least one presently preferred embodiment of the present invention, it may be helpful to review some shortcomings and disadvantages of conventional efforts.

The problem of enabling databases to return semantically relevant results and not just what is explicitly stored in the databases has been studied in a variety of systems. For example, fuzzy logic-based queries [16] to a database allow expressing the intent of a user when the semantics of the query are vague. The results of such queries are in the form of a degree of membership in a set. SemanticAccess [17] allows building queries according to a higher-level semantic data model. However, the problem with these approaches is that they do not use additional domain knowledge which may be available. They also lack the ability to infer additional semantically relevant results from the basic facts they have at their disposal.

The area of semantic web services has seen some interest in trying to use flexible discovery mechanisms for matching service requests with advertisements (such as the work in [19]). These mechanisms typically involve the use of semantic descriptions of requests and advertisements in OWL-S or DAML-S, and the use of description logic reasoning to check if the request is equivalent to, subsumes or is subsumed by the advertisement. However, so far, not much work has been done on returning semantically relevant matches to a user query on a relational database.

There is some work that extends RDBMS with some OWL inference capabilities, e.g. Sesame [12], Jena[13], DLDB[14] and InstanceStore[15]. These systems are primarily used for storing and querying ontologies represented in RDF or OWL. They also do reasoning on these ontologies. The main difference between these systems and the presently inventive systems is that the former are oriented towards ontologies and not towards any structured data in relational databases; they cannot do reasoning or perform semantic queries on data in arbitrary relational databases. Systems configured in accordance with at least one embodiment of the present invention also support information retrieval by trying to return different levels of semantically relevant results to a user query.

Das et al. [27] describe a method for supporting ontology-based semantic matching in RDBMS. That method requires changes to SQL by introducing new operators to enable semantic matching. The system involved is mainly used for querying and doing inferencing on ontologies written in OWL. Systems configured in accordance with at least one embodiment of the present invention, however, are targeted towards supporting semantic queries on relational data in databases.

In the information retrieval area, various query expansion techniques (such as in [18, 20, 21, 22]) are commonly used to add extra search terms to a query to return more useful results. Some of these techniques also consider the semantics of query terms. However, most work on information retrieval is based on keyword based queries, whereas, in accordance with at least one embodiment of the present invention, there are considered semantic queries expressed in SPARQL. SPARQL allows for imparting more structure to the query, such as referring to terms defined in an ontology and describing the relationships between terms. While it takes greater effort to specify a SPARQL query rather than a keyword-based query, a query in SPARQL provides more information and helps in retrieving more semantically relevant results.

There has been some work in trying to do information retrieval in the Semantic Web. For example, [23] and [24] suggest ways of ranking results in the Semantic Web. Swoogle [25] is a crawler-based indexing and retrieval system for the Semantic Web. It also defines a measure for determining the importance of a Semantic Web document. Ali [26] describes an information retrieval system that mutates semantic queries, similar to how antibodies are mutated in the human immune system These techniques, however, are targeted towards Semantic Web documents (such as RDF or OWL documents), while systems configured in accordance with at least one embodiment of the present invention are targeted towards relational databases.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for accessing and managing a relational database, said apparatus comprising:
   a processor;
   an arrangement for querying a relational database; and
   an arrangement for accessing semantically relevant query results from the relational database, said accessing arrangement configured to:
   access at least one ontology;
   extract domain knowledge from at least one ontology; and
   employ the domain knowledge in obtaining the semantically relevant query results from the relational database;
   wherein said semantically relevant query results comprise direct results obtained directly from relational database tables, inferred results inferred utilizing information explicitly listed in the relational database and the at least one ontology, and related results obtained utilizing data in the relational database tables and one or more definitions of similarity of concepts and individuals based on the at least one ontology; and wherein said accessing arrangement acts to: apply a query generalization strategy, the query generalization strategy comprising applying strategies to an original query to obtain a generalized level of queries comprising one or more general queries and repeatedly applying the strategies to the generalized level of queries until a prespecified number of results is obtained; and rank results obtained through the query generalization strategy based on a number generalizations performed.

2. The apparatus according to claim 1, wherein:
said querying arrangement queries the relational database using SPARQL, and
said accessing arrangement interfaces with the relational database in a manner to obtain SPARQL querying results.

3. The apparatus according to claim 2, wherein said accessing arrangement further acts to define and obtain the semantically relevant query results in terms of at least one category relevant to a query.

4. The apparatus according to claim 3, wherein the at least one category relates to at least one ontology accessed by said accessing arrangement.

5. The apparatus according to claim 4, wherein said accessing arrangement acts to obtain supplementary query results that are related to actual query results.

6. The apparatus according to claim 2, wherein said at least one ontology comprises:
domain ontologies that provide additional knowledge about entities, relations, and instances in the relational database;
data-modeling ontologies that describe a semantic model of data described in the relational database and reuses concepts described in domain ontologies; and
custom ontologies that define concepts, properties, and individuals required for specific application.

7. The apparatus according to claim 1, wherein said accessing arrangement comprises a description logic reasoner configured to obtain the inferred results based on domain knowledge in the at least one ontology and data listed in the relational database, the description logic reasoner allowing for inferring query results not explicitly stated in the relational database.

8. The apparatus according to claim 7, wherein said accessing arrangement comprises a Minerva reasoner configured to obtain the inferred results.

9. The apparatus according to claim 1, further comprising a standby description logic reasoner configured for backing up said description logic reasoner.

10. The apparatus according to claim 1, further comprising a wrapper arrangement which acts to translate data from the relational database into a predetermined format for said accessing arrangement.

11. The apparatus according to claim 10, wherein said wrapper arrangement acts to translate data from the relational database into triples.

12. The apparatus according to claim 1, wherein said accessing arrangement acts to apply the query generalization strategy to modify the original query semantically with more general queries to obtain broader results.

13. The apparatus according to claim 12, wherein the query generalization strategy comprises subsumption hierarchy based constraint generalization.

14. A method of accessing and managing a relational database comprising:
executing a program of instructions with a machine, the program of instructions being configured to:
query a relational database; and
access semantically relevant query results from the relational database, wherein to access query results from the relational database further comprises;
accessing at least one ontology;
extracting domain knowledge from at least one ontology and;
employing the domain knowledge in obtaining the semantically relevant query results from the relational database;
wherein said semantically relevant query results comprise direct results obtained directly from relational database tables, inferred results inferred utilizing information explicitly listed in the relational database and the at least one ontology, and related results obtained utilizing data in the relational database tables and one or more definitions of similarity of concepts and individuals based on the at least one ontology; and
wherein to access semantically relevant query results comprises: applying a query generalization strategy, the query generalization strategy comprising applying strategies to an original query to obtain a generalized level of queries comprising one or more general queries and repeatedly applying the strategies to the generalized level of queries until a prespecified number of results is obtained; and ranking results obtained through the query generalization strategy based on a number generalizations performed.

15. The method according to claim 14, wherein:
to query comprises querying the relational database using SPARQL; and
to access semantically relevant query results comprises interfacing with the relational database in a manner to obtain SPARQL querying results.

16. The method according to claim 15, wherein to access semantically relevant query results further comprises defining and obtaining query results in terms of at least one category relevant to a query.

17. The method according to claim 16 wherein the at least one category relates to at least one ontology.

18. The method according to claim 17, wherein to access semantically relevant query results comprises obtaining supplementary query results that are related to actual query results.

19. The method according to claim 18, wherein said step of obtaining supplementary query results comprises applying the query generalization strategy to modify the original query semantically with more general queries to obtain broader results.

20. The method according claim 19, wherein the query generalization strategy comprises subsumption hierarchy based constraint generalization.

21. The method according to claim 15, wherein said at least one ontology comprises:
domain ontologies that provide additional knowledge about entities, relations, and instances in the relational database;
data-modeling ontologies that describe a semantic model of data described in the relational database and reuses concepts described in domain ontologies; and
custom ontologies that define concepts, properties, and individuals required for a specific application.

22. The method according to claim 21, wherein said to access semantically relevant query results further comprises:
obtaining supplementary query results that are related to actual query results, wherein said step of obtaining supplementary query results comprises applying the query generalization strategy which modifies the original query, the query generalization strategy comprising transitive-property hierarchy based constraint generalization, 23. The method according to claim 15, wherein the semantically relevant query results do not strictly match the query.

24. The method according to claim 15, wherein the program of instructions is further configured to:
load relevant ontologies into a primary system;
assert entries in the relational database into the primary system via converting database rows into ABoxes with a database wrapper, wherein the database wrapper converts the rows into ABoxes and asserts the ABoxes into the primary system;
utilize a query processor to take in one or more SPARQL queries and pose the one or more SPARQL queries to the primary system; and
employ a standby system to perform re-computing in response a change in one or more TBoxes, wherein the change to one or more TBoxes occurs in response to a concept of property insertion, modification or deletion.

25. The method according to claim 14, wherein to access semantically relevant query results comprises employing a description logic reasoner configured to obtain the inferred results based on domain knowledge in the at least one ontology and data listed in the relational database, the description logic reasoner allowing for inferring query results not explicitly stated in the relational database.

26. The method according to claim 25, wherein employing a description logic reasoner comprises employing a Minerva reasoner configured to obtain the inferred results.

27. The method according to claim 14, wherein to access semantically relevant query results further comprises employing a standby description logic reasoner for backing up said description logic reasoner.

28. The method according to claim 14, further comprising translating data from the relational database into a predetermined format.

29. The method according to claim 28, wherein translating comprises translating data from the relational database into triples.

30. A non-transitory program storage device readable by machine, tangibly embodying a program of instructions executable by the machine to perform steps for accessing and managing a relational database comprising:
querying a relational database; and
accessing semantically relevant query results from the relational database, said accessing step comprising:
accessing at least one ontology;
extracting domain knowledge from at least one ontology; and
employing the domain knowledge in obtaining the semantically relevant query results from the relational database;
wherein said semantically relevant query results comprise direct results obtained directly from relational database tables, inferred results inferred utilizing information explicitly listed in the relational database and the at least one ontology, and related results obtained utilizing data in the relational database tables and one or more definitions of similarity of concepts and individuals based on the at least one ontology; and
wherein said accessing semantically relevant query results comprises: applying a query generalization strategy, the query generalization strategy comprising applying strategies to an original query to obtain a generalized level of queries comprising one or more general queries and repeatedly applying the strategies to the generalized level of queries until a prespecified number of results is obtained; and ranking results obtained through the query generalization strategy based on a number generalizations performed.

31. The non-transitory program storage device according to claim 30, wherein said accessing semantically relevant query results comprises employing a description logic reasoner configured to obtain inferred results based on domain knowledge in the at least one ontology and data listed in the relational database, the description logic reasoner allowing for inferring query results not explicitly stated in the relational database.

* * * * *